United States Patent
Leise et al.

(10) Patent No.: US 6,741,296 B1
(45) Date of Patent: May 25, 2004

(54) MULTI-HEMISPHERE COLOR CRT

(75) Inventors: Lawrence Edward Leise, Cary, NC (US); Susan Ann Luerich, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,749

(22) Filed: Jan. 4, 2000

(51) Int. Cl.[7] .................................................. H04N 5/65
(52) U.S. Cl. ....................... 348/820; 348/806; 348/829; 348/831
(58) Field of Search ................................ 348/820, 805, 348/806, 808, 825, 827, 828, 829, 830, 831, 836, 843, 776, 787, 789, 791, 792, 794; 445/3, 4, 6; 315/370, 8, 85; H04N 9/29

(56) References Cited

U.S. PATENT DOCUMENTS

| | | | |
|---|---|---|---|
| 4,908,550 A | 3/1990 | Chase et al. | 315/8 |
| 4,950,955 A | 8/1990 | Hoover et al. | 315/8 |
| 5,015,915 A | 5/1991 | Hartmann et al. | 315/8 |
| 5,176,556 A | * 1/1993 | Morohashi | 445/3 |
| 5,642,175 A | * 6/1997 | Hirakawa | 348/806 |
| 5,644,197 A | 7/1997 | Leaver | 315/378 |
| 5,705,899 A | 1/1998 | Penninga et al. | 315/368.26 |
| 5,734,234 A | * 3/1998 | Smith et al. | 315/370 |
| 5,847,511 A | * 12/1998 | Lee | 315/8 |
| 5,861,711 A | 1/1999 | Kim et al. | 313/440 |
| 5,959,392 A | * 9/1999 | Beeteson | 313/313 |

FOREIGN PATENT DOCUMENTS

| | | |
|---|---|---|
| GB | 2 317 314 A | 3/1998 |
| JP | 9-182099 | 7/1997 |

* cited by examiner

Primary Examiner—Michael H. Lee
Assistant Examiner—Trang U. Tran
(74) Attorney, Agent, or Firm—J. Bruce Schelkopf; Winstead Sechrist & Minick

(57) ABSTRACT

The present invention discloses a color CRT system that can be easily adapted for installations in either the northern or the southern hemisphere. The CRT is symmetrical with respect to its yamming or set up for the earth's magnetic field so the CRT can be installed in either a normal or an inverted orientation. Likewise the yoke and yoke connector are designed and can be easily installed so the CRT scan starts in the upper left of the CRT in either the normal or inverted installation. The connectors for the neck video card are designed to exit the side of the card so the wires can be routed to the CRT system card in either CRT installation orientation. Finally the anode wire is made with a length and attachment point such that the anode is wireable when the CRT is in the normal or inverted orientation. Also disclosed are visual orientation markings on the CRT, the yoke and yoke connectors and the neck video card connectors so it is easy to visually see when all elements are correctly installed for either the northern or the southern hemisphere installations.

16 Claims, 7 Drawing Sheets

MULTI-HEMISPHERE COLOR CRT

TECHNICAL FIELD

The present invention relates in general cathode ray tubes used in display systems, and in particular, to color displays using cathode ray tubes that installed in data processing systems that are marketed world wide.

BACKGROUND INFORMATION

Cathode ray tube (CRT) displays are used in televisions, most computer displays and many other displays and monitors. Color CRTs create images by impinging an electron beam on the face of an evacuated glass tube that has been coated with phosphors that emit light at the primary colors. The intensity of the colors depends on the intensity of the electron beam that impinges on the particular emission phosphor.

To create a full screen image the electron beams are scanned in a raster and modulated electronically. Moving electrons are affected by and undergo a force if they are moving in a magnetic field. Since CRTs are manufactured in very large volumes, the CRTs are adjusted or "yammed" at the site of manufacture. These adjustments are made to insure that images are placed on the screen or face of the tube for correct viewing. Since the earth has a magnetic field, adjustments made at one point of manufacture may cause viewing errors when the CRT is shipped to a another geographic location, e.g. another hemisphere. Some manufacturers of color CRTs have incorporated correction circuitry to electronically correct for variations in the earth's magnetic field.

Providing CRTs that were adjusted in the factory to compensate for the earth's magnetic field at the point of use was one of the lowest cost ways to correct the problem. In the early development of color CRTs as many as seven different part numbers were used at times to account for the variations in the earth's magnetic field at various geographic locations. However, advances in CRT manufacture has reduced to three the number of different CRTs of a type that are manufactured and adjusted for variations in the earth's magnetic field; one for the northern, southern, and equatorial hemispheres.

Since multiple part numbers in any high volume part may create cost and inventory problems, it would be advantageous to further reduce the number of part numbers for CRTs since they are shipped to every part of the world. A method for reducing the number of CRT part numbers that is simple and cost effective is needed. Further, it would be beneficial if the CRT manufacturing method that reduced the number of part numbers also allowed CRTs manufactured in one area to be easily adapted to another.

SUMMARY OF THE INVENTION

The present invention discloses a method for reducing the part numbers on CRTs manufactured for shipment worldwide. The method includes the steps to produce only two part numbers instead of three normally used for northern hemisphere, southern hemisphere and equatorial hemisphere distribution. The CRT is made and adjusted so that the southern and northern hemisphere parts are symmetrical relative to their magnetic field bias to account for the earth's magnetic field. To account for the different CRT magnetic field bias needed for the southern and northern hemispheres, the CRT is installed in either normal or inverted orientation.

The yoke design for the CRT of the present invention has a connector that can also be installed in either the normal or the inverted connector orientation. The yoke connector enables signals and signal routing so the start scan is in the upper left corner of the CRT when it is in either the normal or inverted orientation. The present invention also has the wiring points to the neck video card that enable proper routing in either the normal or inverted installation of the CRT. The symmetrical design of the CRT and the disclosed configuration of the yoke connections and the neck video card connections a design that reduces to two the CRTs needed for color CRT displays shipped to the, southern, northern, or equatorial hemispheres. The present invention also enables simple conversion of the southern or northern hemisphere CRT by rotating the CRT 180 degrees when installed in a system configured for shipment to either the southern and northern hemisphere.

The various parts of the CRT system that are altered for the different installations, CRT, yoke connector and neck video card connectors may also have visual indicators to show when all of the elements are in a correct orientation for a given installation.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
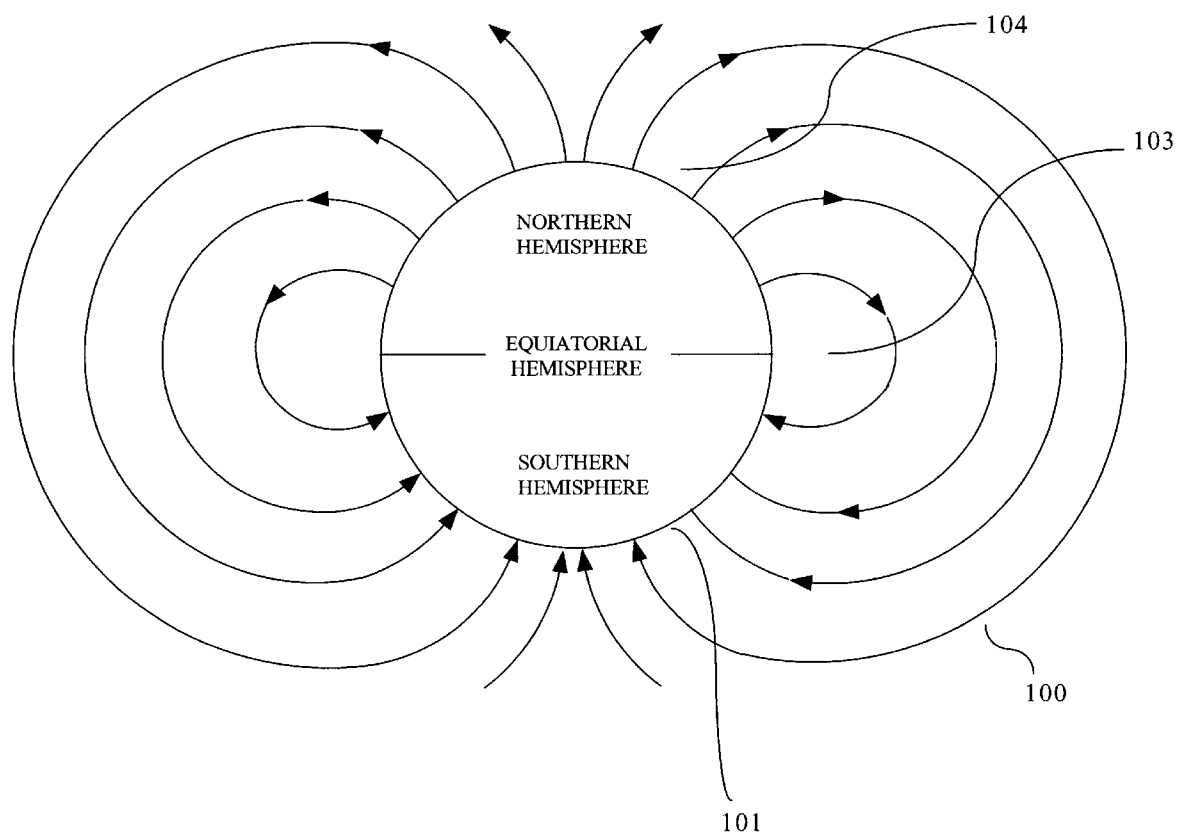
FIG. 1 is an illustration of the earth's magnetic field.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The earth has a magnetic field that affects the electron beam of a CRT by exerting a force and deflecting the beam off of a given path. The earth's magnetic field is substantially static at a given location but does vary over geographic distances, for example from the northern, southern and equatorial hemispheres of the earth. System electronics that control the CRT display system start scanning the electron beams that "paint" a CRT display image at a particular point on the face of the CRT. Unless the effects of the earth's magnetic field are accounted for, the starting point of the electron beams will vary depending on the geographical location where the CRT display system is used. CRTs typically have magnetic components positioned around the neck of the CRT that are adjusted at the factory to offset or bias the CRT for a particular geographic installation. The magnetic components are magnetic material that can be magnetized during manufacture to create a bias field. The adjustments made in CRTs at the time of manufacturing are referred to as "yamming". Present advances in CRT manufacturing have enabled as few as three CRTs with fixed factory magnetic bias adjustments to cover the world market (i.e., northern, southern and equatorial hemispheres). The present invention reduces that number to two, one part for the northern and southern hemispheres and one for the equatorial hemisphere. The present invention also allows the CRT installed for the northern or southern hemispheres to be easily changed so a CRT setup for a northern hemisphere installation can be easily adapted to a southern hemisphere setup and visa-versa. The change from a northern hemisphere to a southern hemisphere installation, or visa-versa can be done in the field away from the factory.

FIG. 1 is an illustration of the earth 101 and the earth's magnetic field. Magnetic field line 100 illustrates a field line exiting and entering the earth essentially perpendicular to the earth's surface. Because the earth is so large relative to a person or system on the surface, all field lines appear to be perpendicular to the earth's surface. A CRT display system installed in the northern hemisphere 102 would experience a magnetic field illustrated as a vector perpendicular to the surface illustrated by a field vector pointing up from the earth's surface. A CRT display system installed in the southern hemisphere 103 would experience a magnetic field, also perpendicular to the earth's surface, but in the opposite direction as one in the northern hemisphere 102. The magnetic field is illustrated by a vector pointing into (southern hemisphere) or out of (northern hemisphere) the earth's surface. Only in the equatorial hemisphere 103 would a CRT display system experience a magnetic field vector that is essentially neutral.

Figure 2A:
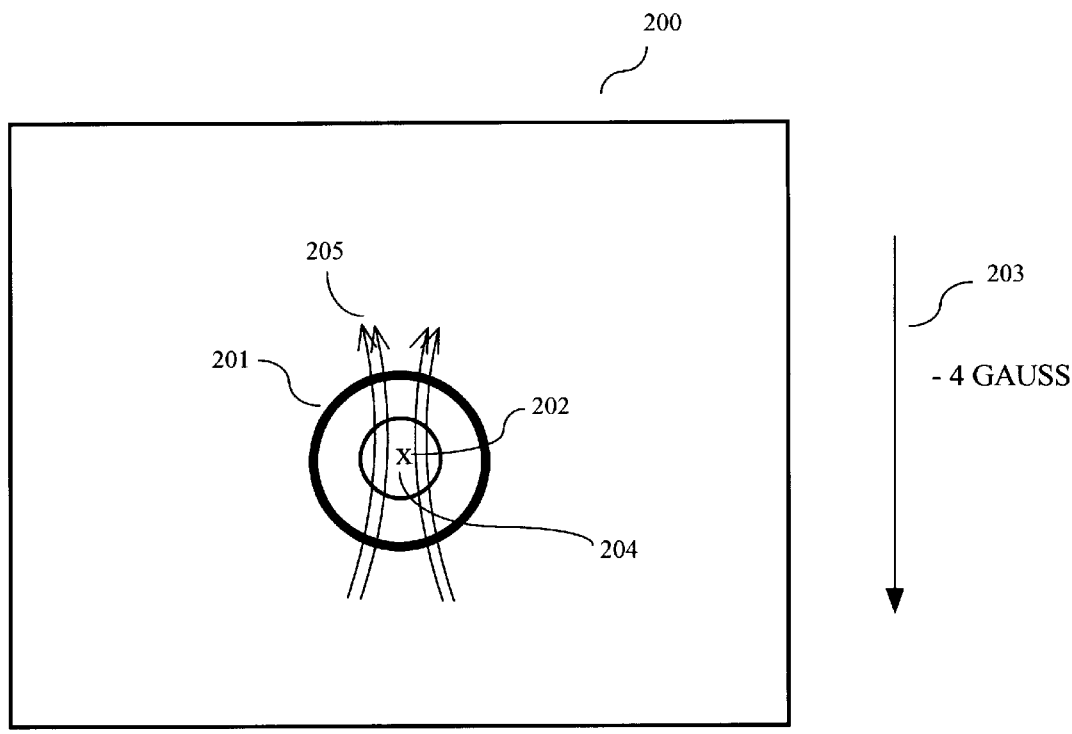
FIGS. 2A and 2B illustrate the vector orientation of the magnetic bias field needed to compensate for the earth's magnetic field for the southern and northern hemispheres respectively.
Figure 2B:
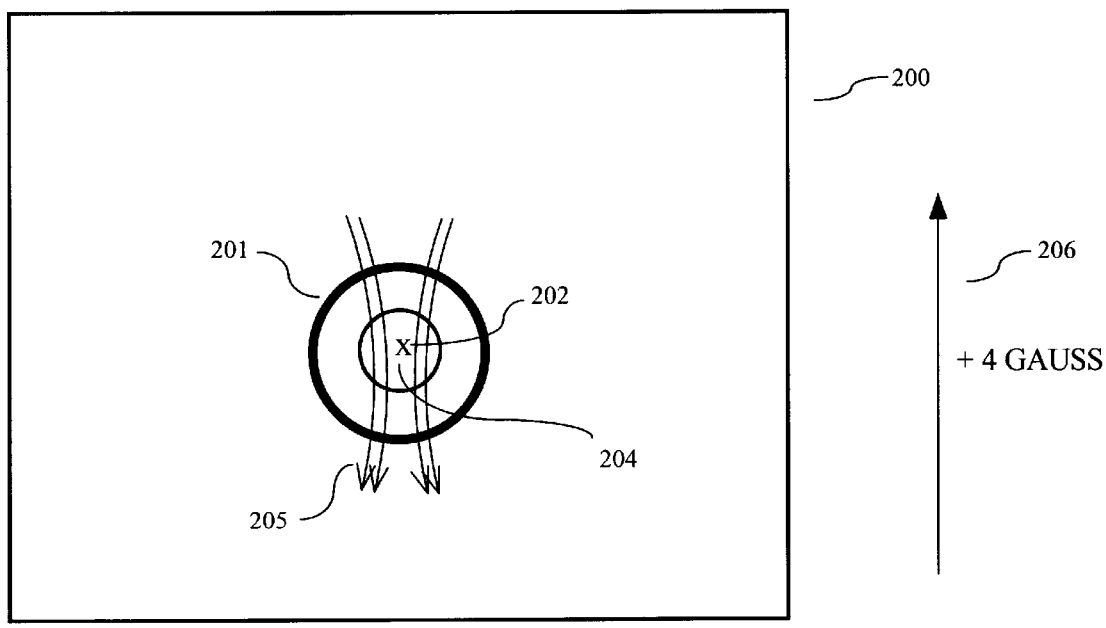

FIG. 2A is an embodiment of the present invention illustrating a CRT 200 and showing the direction of a magnetic field bias 205 set to +4 gauss in the vertical direction to offset the earth's magnetic field 203. The arrow 203 represents the earth's magnetic field direction relative to the magnetic field bias 205 in the northern hemisphere. The X 204 represents an electron beam perpendicular to the magnetic field bias 205 and going into the page. Circle 202 illustrates the cross section of the neck of a CRT 202 in which the electron beam X 204 is generated. Circle 210 is illustrative of bias magnetic components placed around the neck of the CRT 202 in such a way as to create a magnetic bias 205. FIG. 2B illustrates the same CRT 200 rotated 180 degrees for a southern hemisphere installation so the vertical magnetic field bias 205 is now opposite or −4 gauss with respect to a vertical pointing to the top of the page. Arrow 206 represents the earth's magnetic field direction relative to the magnetic field bias 205 in the southern hemisphere.

A CRT 200, in one embodiment of the present invention, is manufactured with a bias magnetic field that is symmetrical for the requirements of the northern and southern hemisphere installations. In the embodiment illustrated in FIGS. 2A and 2B the magnetic bias field 205 is 4 gauss, the direction of the bias depends on the CRT orientation. Other magnetic bias fields may be used for a particular CRT as long as the symmetry is maintained for a northern and a southern hemisphere installation and the magnetic field bias 205 compensates for the earth's magnetic field for the particular CRT. When CRT 200 is installed as shown in FIG. 2A, an electron beam illustrated by X 204 would experience a force in one direction resulting from the earth's magnetic field and in the opposite direction by the magnetic bias field 205, thus compensating for the earth's magnetic field. If CRT 200, with the magnetic bias field 205 in FIG. 2A, was moved to an opposite hemisphere the earth's magnetic field would be reversed and instead of compensating, the magnetic bias field 205 would add to the force experienced by the electron beam X 204. If, however, CRT 200 was inverted, the same magnetic bias field 205 would again compensate for the effect of the earth's magnetic field.

Figure 3:
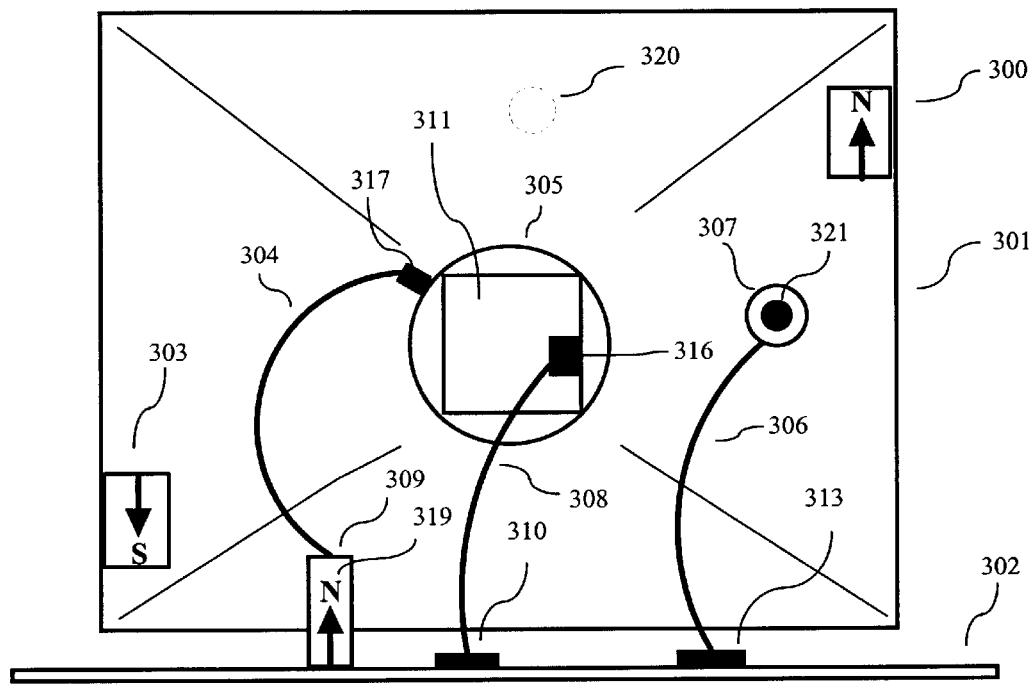
FIG. 3 illustrates an embodiment of the present invention with a CRT orientated for a northern hemisphere installation.

FIG. 3 is an illustration of an embodiment of the present invention containing elements of a CRT system and with CRT 301 mounted for a northern hemisphere installation. CRT 301 is illustrated viewing from the rear so the system components and their unique features can be seen. Yoke 305 surrounds the CRT neck 312 (visible in FIG. 5) and contains the magnets used to bias and deflect the electron beam (not shown) that impinges on the CRT face 400 (shown in FIG. 5) of the CRT 301. The electrical signals that drive the electromagnets in the yoke 305 are coupled via connector 3 17 and cable 304 to the system electronics board 302 with yoke connector 309. Anode wire 306 connects the system electronics board 302 high voltage output connector 313 to the CRT anode button 321. An alternate location 320 of the CRT anode button 321 may be present on some CRT products, but this could be easily accommodated by sufficient length of anode wire 306. Anode connector 307 typically has a rubber boot over its connection point because of the high voltage on the anode wire 306. System electronics board 302 contains circuits used to drive the CRT system, such as the components discussed below with respect to FIG. 7. The neck video card 311 is mounted perpendicular to the CRT neck 312 (see FIG. 5) and connects to the system electronics board 302 via wire 308 with neck video connectors 310 and 316. Installation indicators 300 and 303 may be used so installation or manufacturing personnel can observe the CRT 301 's orientation relative to its bias adjustment. That is, in FIG. 3, for installation in the northern hemisphere, the indicator 300 is to point upwards and should match with the indicator 319, explained in further detail below.

Figure 6A:
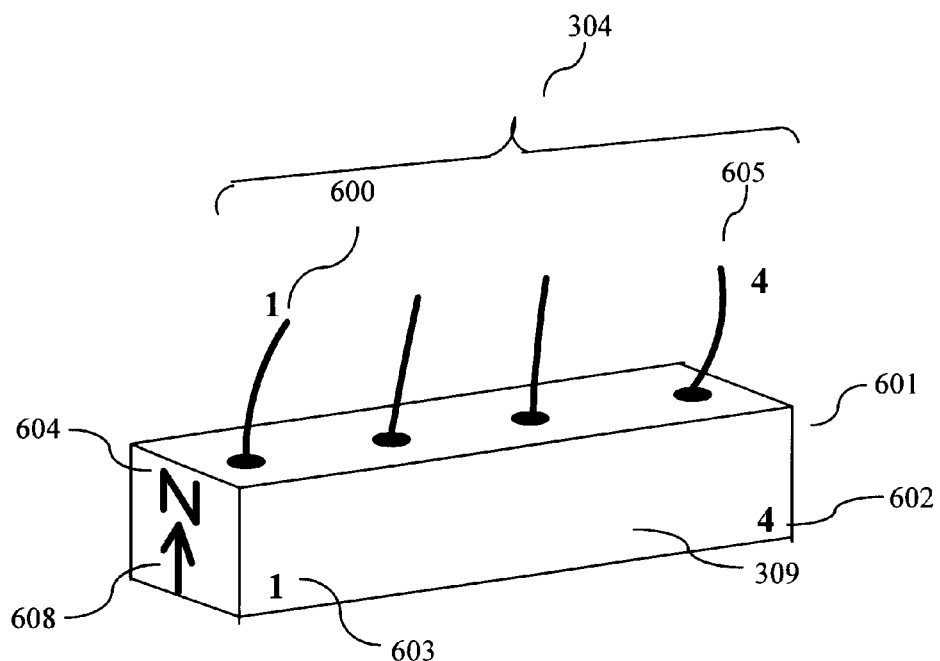
FIGS. 6A and 6B illustrate an embodiment of the present invention illustrating a yoke connector installed in two different configurations of the CRT.
Figure 6B:
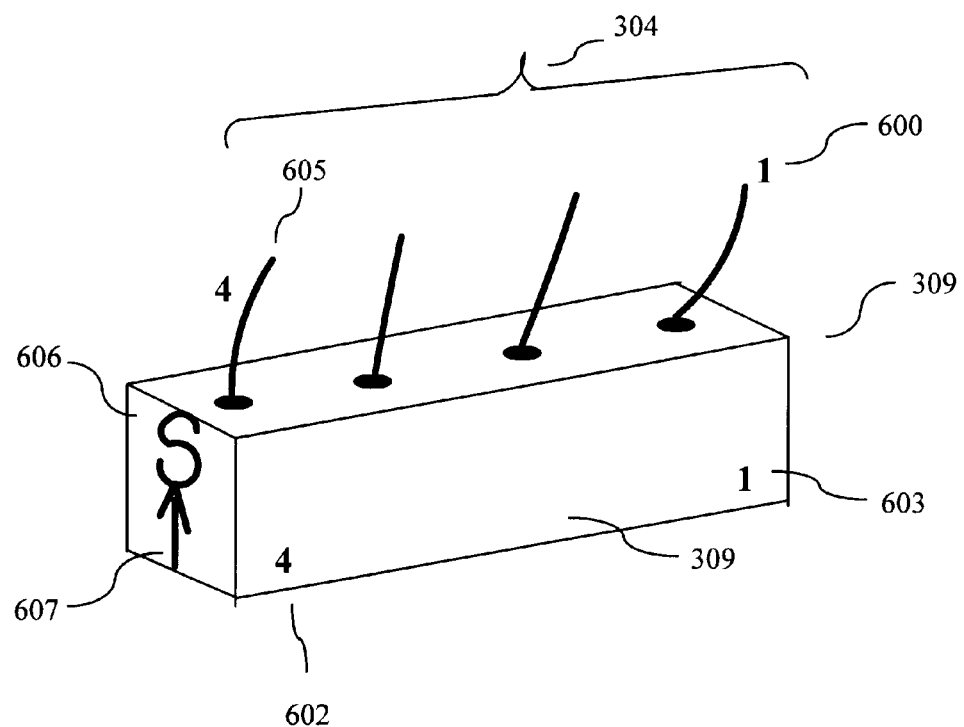

The video scan of the CRT 301 starts in the upper left hand corner of the CRT when viewed from the front. Since the yoke 305 and its associated electronic components determine the deflection of the scanning electron beam that generates displayed images, the connector 309 must also be symmetrically wired for a northern or southern hemisphere installation. In a northern hemisphere installation the yoke connector 309 plugs in one way and in a southern hemisphere installation it is reversed. The details of yoke connector 309 are shown in FIGS. 6A and 6B. Whenever the CRT 301 is inverted, the yoke connector 309 must also be inverted so the proper signals are altered causing the scan to again start in the upper left corner of the CRT 301 in its inverted orientation, again viewed from the front. Since the CRT 301 could be inverted with also inverting the yoke connector 309 it is desirable to have an indication of when the connector and the CRT 301 are in corresponding orientations. Installation indicators 604 and 608 may be placed on the yoke connector 309 so installation personnel can see if all the connections are proper for a given installation. This would be particularly beneficial if CRTs installed for the northern hemisphere were later inverted for a southern hemisphere installation. After inverting the CRT 301, personnel could simply observe the indicators to see if the corresponding inversion of yoke connector 309 was done.

Figure 4:
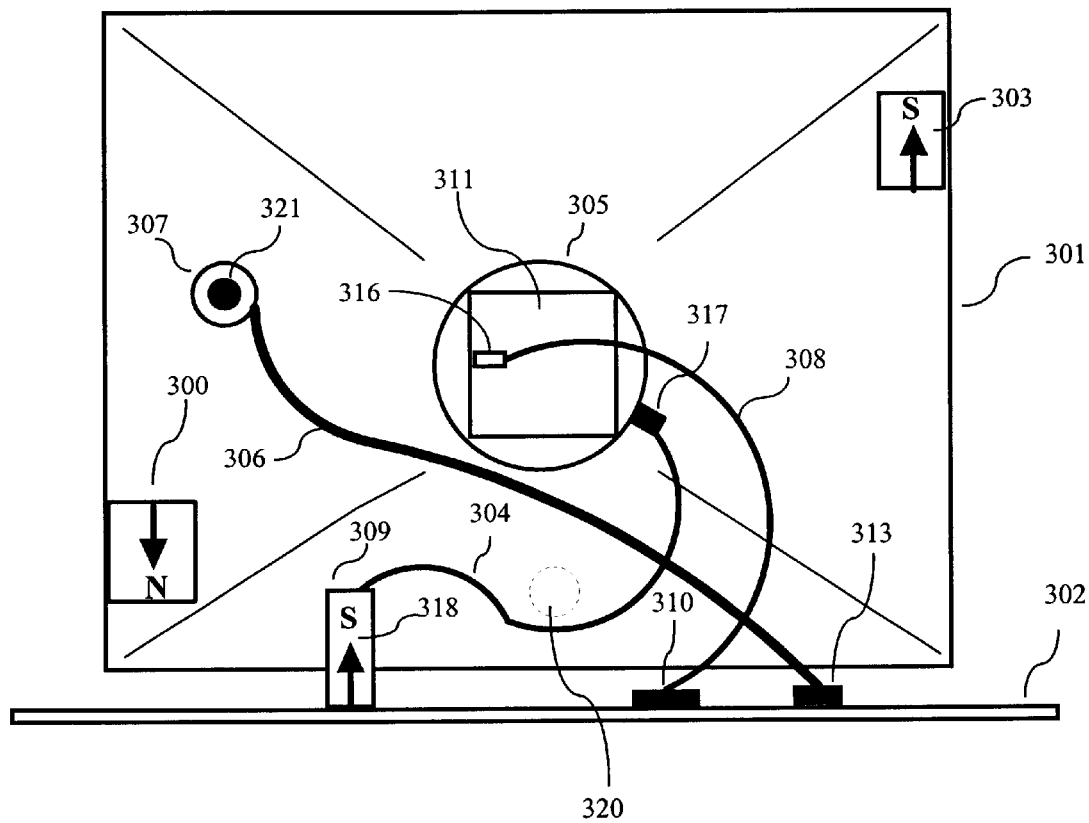
FIG. 4 illustrates the embodiment of the present invention shown in FIG. 3 inverted for a southern hemisphere installation.

FIG. 4 illustrates the CRT 301 inverted for a southern hemisphere installation. That is, the CRT 301 is mounted so that indicator 303 points upwards and matches with the orientation of indicator 318. Since the anode connection via connectors 307 and 313 and wire 306 remain with the CRT, the wire length nor connections have to change. However, the routing of the anode wire 306, for embodiments of the present invention, is such that no interference with the loop in anode wire 306 occurs with other CRT system components when inverting CRT 301. Video neck card wire 308 and connector 316 and yoke wire 304 and connector 317 change their orientation with respect to system electronics board 302. System electronics board connections via connectors 315 and 310 must be changed. Connector 310 may have to be unplugged and re-plugged while inverting CRT 301. Yoke connector 309 is also inverted when the CRT 301 is inverted, as further described below with respect to FIGS. 6A and 6B. Installation indicator 318 illustrates one embodiment of the present invention with yoke connector 309 having installation indicators consistent with those of CRT 301.

Figure 5:
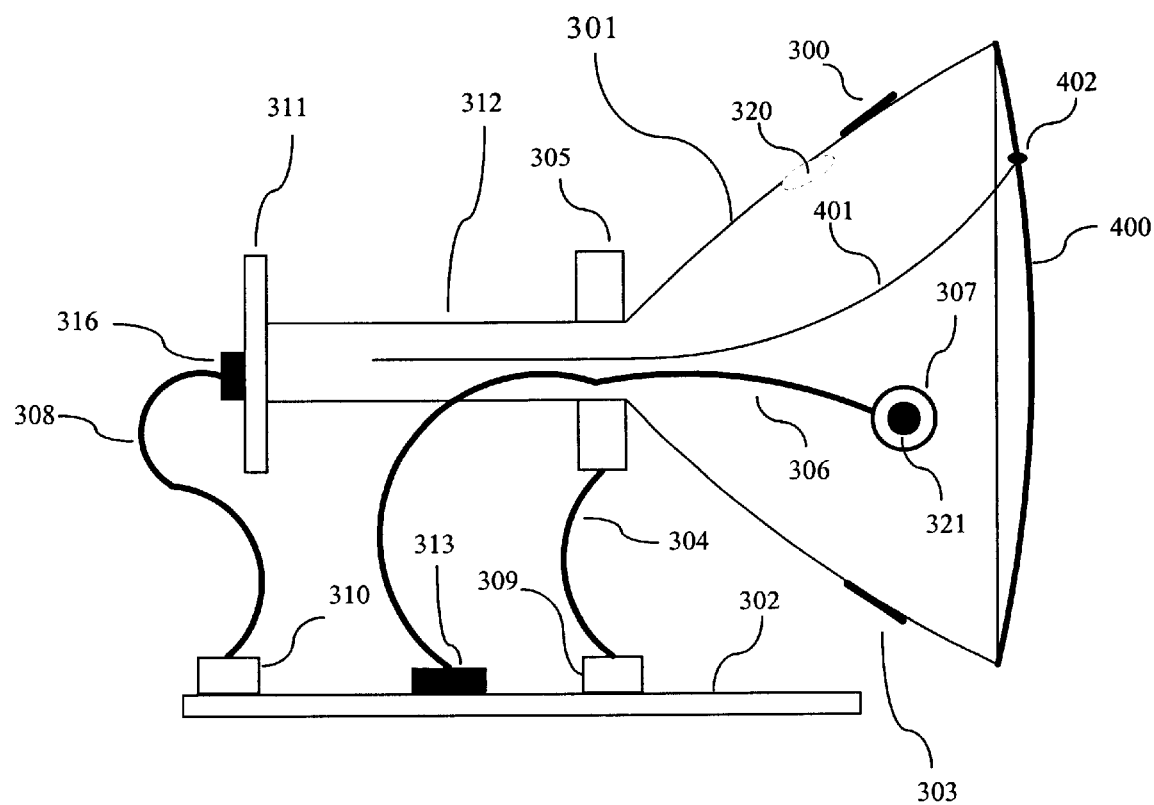
FIG. 5 is a side view of a CRT illustrating features of an embodiment of the present invention.

FIG. 5 is a side view of the CRT 301, system board 302 and the various other components of the CRT system illustrated in FIGS. 3 and 4. The CRT neck 312 is visible only in FIG. 5 as well as the relative position of the yoke 305 on the CRT neck 312. An electron beam illustrated by 401 is also shown in FIG. 5. The electron beam 401 is deflected by yoke 305 generating dynamic magnetic fields (not shown). The electron beam 401 is deflected by the yoke 305 and hits, for example, a target 402 on the face 400 of CRT 301. The other system components shown in FIG. 5 have been already explained; FIG. 5 gives another view of the relationship of components.

FIGS. 6A and 6B illustrate a yoke connector 309 in the two orientations discussed previously, one for a northern hemisphere installation (FIG. 6A) and one for a southern hemisphere installation (FIG. 6B). Wire 600 through wire 605 make up yoke cable 304. In this illustration, wire 600 and wire 605 would exchange connections to the system electronics board 302 when the connector is inverted. If all other connections remained the same and the two connections that switched signaled the systems electronics on system card 302 to apply a correct signal to the yoke to start the scan again in the upper left hand corner as viewed from the front, then the combination of inverting the CRT 301 and inverting the yoke connector 309 would have converted a CRT manufactured for installation in one hemisphere to one that is operable in the opposite hemisphere. In the illustration of FIG. 6A the yoke connector 309 is in the normal orientation for a northern hemisphere installation and in FIG. 6B it is in the inverted orientation for a southern hemisphere installation. Indicators 604 and 608 make up installation indicator 319 (shown in FIG. 3) and indicators 606 and 607 make up installation indicator 318 (shown in FIG. 4). Label 602 indicates the fourth connector and label 603 indicates the first connector. Labels 602 and 603 are shown to illustrate what happens when the yoke connector 309 is inverted.

Figure 7:
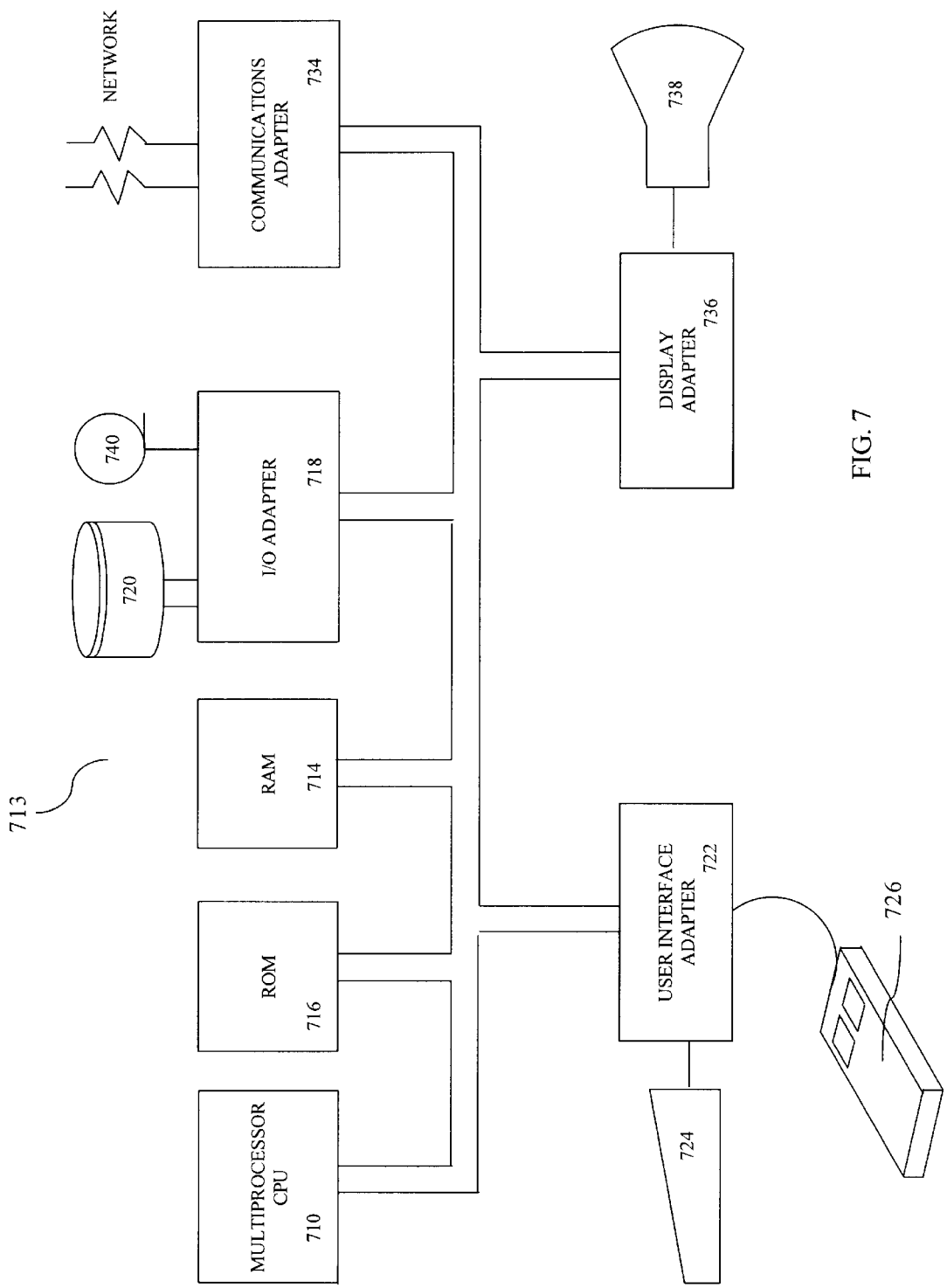
FIG. 7 is a system diagram of a system that could use various embodiments of the present invention.

A representative hardware environment for practicing the present invention is depicted in FIG. 7, which illustrates a typical hardware configuration of data processing system 713 in accordance with the subject invention having central processing unit (CPU) 710, such as a conventional microprocessor, and a number of other units interconnected via system bus 712. Data processing system 713 includes random access memory (RAM) 714, read only memory (ROM) 716, and input/output (I/O) adapter 718 for connecting peripheral devices such as disk units 720 and tape drives 740 to bus 712, user interface adapter 722 for connecting keyboard 724, mouse 726, and/or other user interface devices such as a touch screen device (not shown) to 20 bus 712, communication adapter 734 for connecting data processing system 713 to a data processing network, and display adapter 736 for connecting bus 712 to CRT display device 738. CPU 710 may include other circuitry not shown herein, which will include circuitry commonly found within a microprocessor, e.g., execution unit, bus interface unit, arithmetic logic unit, etc. CPU 710 may also reside on a single integrated circuit.

CRT display device 738 may be manufactured according to an embodiment of the present invention and the data processing system of FIG. 7 would be able to have a CRT display device 738 reconfigured in the field for an installation in either the southern or northern hemisphere. All of the system components shown in FIG. 7 may be contained on systems electronics board 302

Although the present invention and its advantages have been described in detail, it should be understood that various changes, substitutions and alterations can be made herein without departing from the spirit and scope of the invention as defined by the appended claims.

What is claimed is:

1. A method for manufacturing a CRT display system that enables a CRT assembly in said CRT display system said CRT assembly having been adjusted for a northern hemisphere installation to be installed in a CRT display system for either said northern hemisphere or said southern hemisphere comprising the steps of:

producing said CRT assembly that is symmetrically compensated so said CRT assembly is installed in a normal orientation for said northern hemisphere or in an inverted orientation for said southern hemisphere;

producing a yoke assembly with a yoke connector that is installed in a first orientation for said northern hemisphere installation or in a second orientation for said southern hemisphere installation, said first orientation causing said start scan in a upper left corner of said CRT assembly when said CRT assembly is installed in said normal orientation and said second orientation causing said start scan in said upper left corner, of said CRT assembly when said CRT assembly is in said inverted orientation;

producing and installing a neck video card with wire lengths and wire exit points on video input and output (I/O) wires so said video I/O wires-can be routed and connected to said CRT system electronics board when said CRT is installed in said normal or said inverted orientation; and installing said CRT assembly in said CRT display system in said normal orientation in said northern hemisphere or in said inverted orientation in said southern hemisphere, further installing said yoke connector in said normal connector orientation in said northern hemisphere or in said inverted connector orientation in said southern hemisphere.

2. The method of claim 1, wherein said CRT is marked with first indicators showing when said CRT assembly is in said normal orientation and in said inverted orientation.

3. The method of claim 2, wherein said yoke connector has second indicators showing said connector normal and said connector inverted orientation.

4. The method of claim 3, wherein all of said first and second indicators have like visual markings that show when all connections and orientations for a particular installation have been correctly made.

5. A CRT system for either a northern or a southern hemisphere installation, comprising:

a CRT assembly symmetrically compensated for the earth's magnetic field so that said CRT assembly is in a normal orientation for said northern hemisphere installation or in a inverted orientation for said southern hemisphere installation; and a yoke assembly with a yoke connector that is installed in a first orientation for said northern hemisphere installation or in a second orientation for said southern hemisphere installation, said first orientation causing a start scan in a upper left corner of a CRT of said CRT assembly when said CRT assembly is installed in said normal orientation and said second orientation causing said start scan in said upper left corner of said CRT when said CRT assembly is in said inverted orientation.

6. The CRT system of claim 5, further comprising:

a neck video card with a side exit I/O wiring, said side exit I/O wiring allowing proper routing and connection of said I/O wiring to a CRT system electronics card when said CRT assembly is in said normal or in said inverted orientation.

7. The CRT system of claim 6, wherein said CRT in said CRT assembly is marked with first indicators showing said normal and said inverted orientation.

8. The CRT system of claim 7, wherein said yoke connector has said second indicators showing said first and said second orientation.

9. The CRT system of claim 8, wherein all of said first and second indicators have like visual markings that show when all connections and orientations for a particular installation have been correctly made.

10. The CRT system of claim 5, wherein said inverted orientation is 180° relative to said normal orientation.

11. A data processing system comprising:

a central processing unit (CPU);

random access memory (RAM);

read only memory (ROM);

a display device;

a display adapter coupled to said display device; and a bus system for coupling said CPU to said RAM, ROM, and display adapter, wherein said display device further comprises:

said CRT system adaptable for either northern or southern hemisphere installation, wherein said CRT system further comprises a CRT assembly symmetrically compensated for the earth's magnetic field so that said CRT assembly is in a normal orientation for said northern hemisphere installation or in a inverted orientation for said southern hemisphere installation, and a yoke assembly with a yoke connector that is installed in a first orientation for said northern hemisphere installation or in a second orientation for said southern hemisphere installation, said first orientation causing a start scan in a upper left corner of a CRT of said CRT assembly when said CRT assembly is installed in said normal orientation and said second orientation causing said start scan in said upper left corner of said CRT when said CRT assembly is in said inverted orientation.

12. The data processing system of claim 11, wherein the CRT system further comprises a neck video card with a side exit I/O wiring, said side exit I/O wiring allowing proper routing and connection of said I/O wiring to a CRT system electronics card when said CRT assembly is in said normal or in said inverted orientation.

13. The data processing system 12, wherein said CRT in said CRT assembly is marked with said first indicators showing said normal and said inverted orientation.

14. The data processing system 13, wherein said yoke connector has said second indicator showing said first and said second orientation.

15. The data processing system 14, wherein all of said first and second indicators have like visual markings that show when all connections and orientations for a particular installation have been correctly made.

16. The data processing system of claim 11, wherein said inverted orientation is 180° relative to said normal orientation.

\* \* \* \* \*